United States Patent
Bonar et al.

(10) Patent No.: US 8,566,183 B1
(45) Date of Patent: Oct. 22, 2013

(54) AUDITING OF ELECTRONIC DEVICE AND PACKAGING

(75) Inventors: Laura M. Bonar, Gardner, KS (US); Katrina E. Kruger, Overland Park, KS (US); Sanjay K. Sharma, Olathe, KS (US); Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 504 days.

(21) Appl. No.: 12/899,944

(22) Filed: Oct. 7, 2010

(51) Int. Cl.
*G06Q 10/00* (2012.01)

(52) U.S. Cl.
USPC ............................................. 705/28; 705/29

(58) Field of Classification Search
USPC .......... 705/1.1, 22, 23, 25, 26.1–30, 317, 318, 705/330–342; 235/385; 714/25, 31, 32, 37, 714/38.1; 700/115
See application file for complete search history.

(56) References Cited

U.S. PATENT DOCUMENTS

| | | | |
|---|---|---|---|
| 7,519,864 B2 | 4/2009 | Alam et al. | |
| 8,027,677 B2 * | 9/2011 | Carpenter | 455/435.2 |
| 8,195,511 B2 * | 6/2012 | Bowles et al. | 705/14.37 |
| 2004/0157599 A1 * | 8/2004 | Holcman et al. | 455/432.1 |
| 2006/0163338 A1 * | 7/2006 | Allen et al. | 235/375 |
| 2007/0239569 A1 * | 10/2007 | Lucas et al. | 705/28 |
| 2009/0125425 A1 * | 5/2009 | Kloostra et al. | 705/29 |
| 2010/0284544 A1 * | 11/2010 | Kim et al. | 381/56 |

* cited by examiner

*Primary Examiner* — Igor Borissov

(57) ABSTRACT

A method of auditing electronic device shipments is provided. The method comprises electronically reading a first serial number on an electronic device, a second serial number on a point-of-sale package containing the electronic device, and a third serial number stored in a memory of the electronic device; storing the first serial number, the second serial number, and a third serial number in a non-transitory memory separate from the electronic device; and automatically comparing the first serial number, the second serial number, and the third serial number. The method further comprises automatically reading from the memory of the electronic device a software version identity associated with software installed on the electronic device and automatically comparing the software version identity with an approved software version identity. The method further comprises, when any miscompare occurs, automatically presenting a notification of an error.

19 Claims, 10 Drawing Sheets

AUDITING OF ELECTRONIC DEVICE AND PACKAGING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices may be associated with an electronic serial number (ESN), a stock keeping unit (SKU), and other identifying information. Electronic devices may be packaged with operating manuals, warning documents, charging devices, and other accessories in a point-of-sale package suitable for distributing to end users, for example consumers. A plurality of point-of-sale packages, each containing an electronic device, may be shipped together in a master carton to a retail store or business location.

When new models of electronic devices are launched into the marketplace, a variety of early production errors may occur. To detect and correct such early production errors and to avoid a negative initial response from the market, new models of electronic devices may be audited before shipping to the retail stores and/or to business locations.

SUMMARY

In an embodiment, a method of auditing electronic device shipments is disclosed. The method comprises electronically reading a first serial number on an electronic device, a second serial number on a point-of-sale package containing the electronic device, and a third serial number stored in a memory of the electronic device; storing the first serial number, the second serial number, and a third serial number in a non-transitory memory separate from the electronic device; and automatically comparing the first serial number, the second serial number, and the third serial number. The method further comprises automatically reading from the memory of the electronic device a software version identity associated with software installed on the electronic device and automatically comparing the software version identity with an approved software version identity. The method further comprises, when any miscompare occurs, automatically presenting a notification of an error. The method further comprises pressing a plurality of keys of a keypad of the electronic device and, in response to the pressing of the keys, adapting a presentation providing key press event feedback, wherein the key press event feedback comprises one of removing keys from a presented list of expected key press events or adding keys to a presented list of detected key press events.

In an embodiment, a method of auditing mobile phone shipments is disclosed. The method comprises electronically reading a first serial number on a mobile phone, a second serial number on a point-of-sale package containing the mobile phone, and a third serial number stored in a memory of the mobile phone; storing the first serial number, the second serial number, and the third serial number in a non-transitory memory separate from the mobile phone; and automatically comparing the first serial number, the second serial number, and the third serial number. The method further comprises automatically sensing a weight of the point-of-sale package and contents, automatically comparing the weight to a predefined weight range, automatically taking a picture of the point-of-sale package contents with a digital camera, and automatically comparing an image of the point-of-sale package contents to a predefined image. When one of the weights is outside of the predefined weight range and the image of the point-of-sale contents does not compare to the predefined image, the method further comprises automatically sending a notification of an error.

In an embodiment, a method of auditing mobile phone shipments is disclosed. The method comprises electronically reading a first stock keeping unit (SKU) number on a mobile phone, electronically reading a second stock keeping unit number on a package containing the mobile phone, storing the first and second stock keeping unit numbers in a non-transitory memory, automatically comparing the stock keeping unit numbers, and when the stock keeping unit numbers miscompare, automatically presenting a first notification of an error. The method further comprises electronically commanding the mobile phone to take a picture with a camera of the mobile phone, electronically reading a picture file from the mobile phone, automatically analyzing the picture file, and when the analysis of the picture file identifies a fault in the picture file, automatically presenting a second notification of an error.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
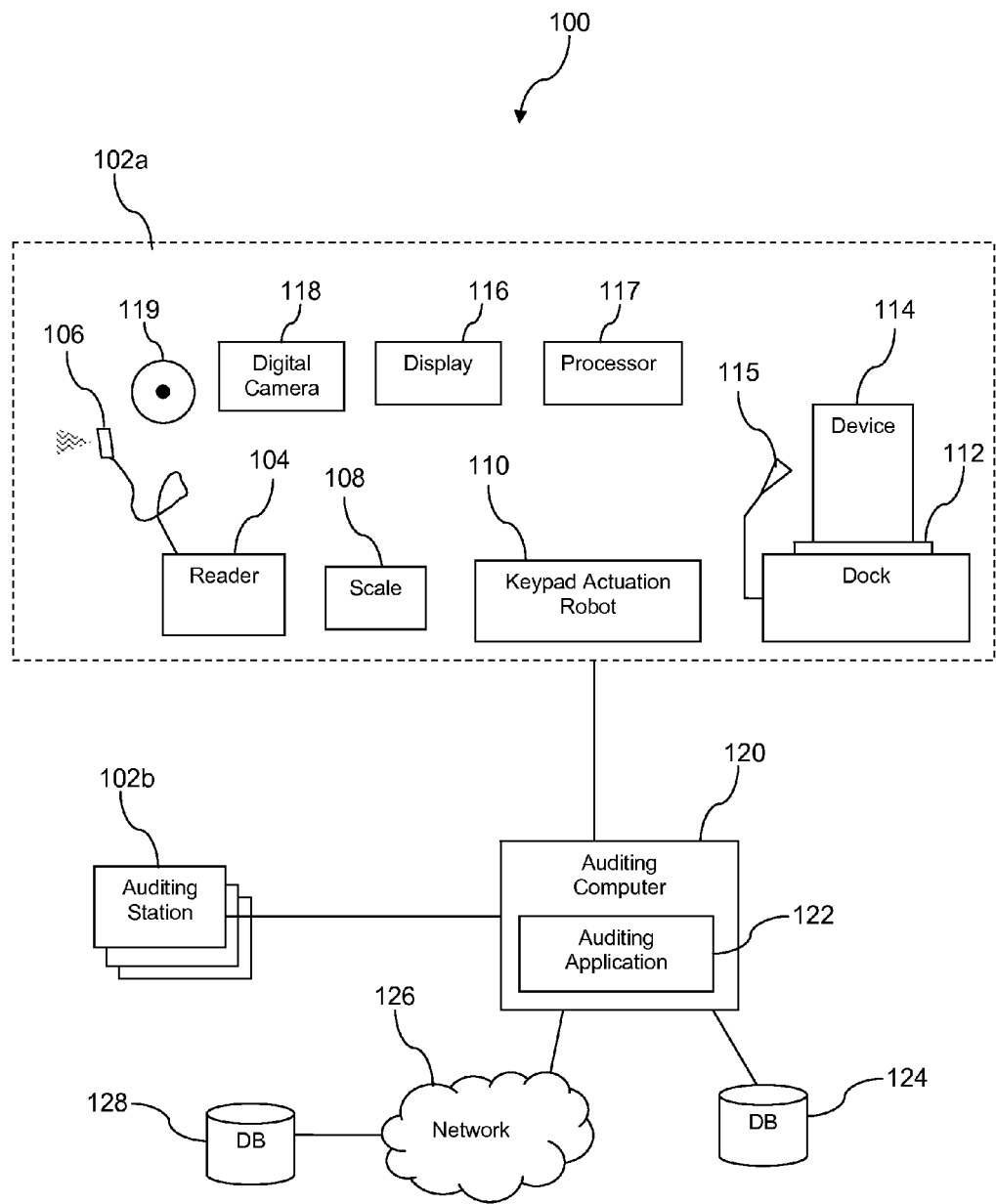
FIG. 1 is a block diagram of an auditing system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Auditing of a new model of electronic device may be performed before initial shipping to retail stores and to business locations to detect and correct errors. A variety of testing of electronic devices that does not comprise auditing may be performed by original equipment manufacturers. For example, original equipment manufacturers may test software features and hardware, for example using one, two, or a small number of prototype devices or early production devices to assure that the design of the electronic devices meets specifications. Auditing of a new model of electronic device, by contrast, may typically select a larger number of production electronic devices that are packaged and ready to ship to paying customers. Additionally, auditing may check many things not tested by original equipment manufacturers, such as point-of-sale package integrity, cosmetic appearance of the electronic device, agreement between labels and/or serial numbers on the electronic device, on the point-of-sale package, and on a master carton containing a plurality of electronic devices, and other items.

In an embodiment, an automated auditing system and method of auditing electronic devices is disclosed. The automated auditing system audits a variety of aspects of both the electronic device itself, the point-of-sale packaging of the electronic device, and the master carton in which a plurality of point-of-sale packages may be shipped. A plurality of serial number codes may each be electronically read, the serial number code translated to a serial number value, and automatically compared to a corresponding serial number value stored in a memory of the electronic device. For example a serial number bar code adhered to an inside cover of the battery compartment of the electronic device, may be electronically read and translated to a device package serial number value; a serial number bar code adhered to or printed on the point-of-sale package may be electronically read and translated to a point-of-sale package serial number value; a serial number bar code adhered to or printed on the master carton may be electronically read and translated to a master carton serial number value. Each of the device package serial number value, the point-of-sale package serial number value, and the master carton serial number value may then be automatically compared with the serial number stored in the memory of the electronic device. To promote concision, hereinafter this process may be described simply as reading and comparing serial numbers, dropping the distinction between a representation of a serial number, for example a bar code, and the value of the serial number itself.

If any of the serial numbers disagree, an alert is raised so that the discrepancy can be resolved. In an embodiment, an email may be sent to an email inbox of a responsible party and/or a responsible manager. The alert that is raised may comprise an audio alert that summons a responsible party to the auditing station to read a message presented on a display of the auditing station. Resolving the discrepancy may comprise both correcting the erroneous serial number and correcting a process error that is the root cause of the erroneous serial number. The auditing system may read and check correlation among other identification information that may appear on the electronic device, on the point-of-sale package, and/or the master carton, such as stock keeping unit (SKU) number, universal product codes (UPCs), and other identification information. In an embodiment, a record of the identification information may be stored by the auditing system for future reference and use.

The auditing system may electronically access and read a software version identity of software installed on the electronic device from the memory of the electronic device and compare this to an approved software version identity, for example a firmware version identity. When the installed software version is different from the approved software version identity, an alert is raised so the discrepancy may be resolved. The system may electronically access and read a preferred roaming list (PRL) stored in the memory of the electronic device and compare this to an approved preferred roaming list. When the preferred roaming list stored in the electronic device is different from the approved preferred roaming list, an alert is raised so the discrepancy may be resolved. In an embodiment, the software version identity and the preferred roaming list stored in the memory of the electronic device are stored by the auditing system for future reference and use.

The auditing system may electronically command a camera of the electronic device to take a picture. The system may then access and read an image file created by the camera of the electronic device and analyze the image file. If the image file fails to meet specifications, an alert is raised so the discrepancy may be resolved. In an embodiment, one or both of the image files and/or the results of the analysis of the image file are stored by the auditing system for future reference and use.

The automated auditing system may perform a number of further auditing checks to determine the readiness of the new model of electronic device for release to the market. The automated auditing system reduces the labor burden of performing the audit. Additionally, the automated auditing system may check parameters and/or settings of the electronic device which are typically skipped by a manual auditing process. Storing many of the auditing results for future reference and use may promote improved trouble shooting and/or customer service after the electronic devices are in use.

Turning now to FIG. 1, an automated auditing system 100 is described. In an embodiment, the system 100 comprises at least a first auditing station 102a, an auditing computer 120, and a first data store 124. In an embodiment, the system may comprise a plurality of auditing stations 102b that are substantially similar to the first auditing station 102a. The first auditing station 102a comprises an electronic reader 104 and/or an electronic sensor 106. The first auditing station 102a may comprise a scale 108, and a docking station 112 for auditing in part an electronic device 114. In an embodiment, the first auditing station 102a may comprise a keypad actuation robot 110, but in other embodiments the first auditing station 102a does not comprise the keypad actuation robot 110. In some contexts, the keypad actuation robot 110 may be referred to as the optional keypad actuation robot 110. The electronic device 114 may be a mobile phone, a personal digital assistant (PDA), a media player, a laptop computer, a notebook computer, a tablet computer, or some other electronic device. In an embodiment, the docking station 112 may comprise a microphone 115. The first auditing station 102a may comprise a display 116, a processor 117, a digital camera 118, and a speaker 119. In an embodiment, the processor 117 is a desktop computer or other computer system and may be communicatively coupled to the electronic reader 104, the scale 108, the optional keypad actuation robot 110, the docking station 112, the display 116, the digital camera 118, and the speaker 119. Computers are discussed in more detail hereinafter.

In an embodiment, the first auditing station 102a may have other apparatus or components. For example, in an embodiment, the docking station 112 may further comprise a speaker (not shown) for auditing a microphone function of the electronic device 114. In an embodiment, the docking station 112 may further comprise a vibration sensor (not shown), for example an accelerometer. In an embodiment, two or more of the components described above as separate may be integrated together in a single package or in a single device.

When making an initial shipment of a new model of electronic device, for example a new model of a mobile phone, it is desirable to audit the product that is going to be shipped. The product comprises the electronic device itself, but also the point-of-sale package in which the device is delivered to the end customer and the master carton in which a plurality of devices are shipped to a retail location or a business. Errors or problems in any one of these three things can diminish acceptance of the new product. For example, a point-of-sale package that has a rip through the exterior of the package may create a negative impression. A mismatch between the identification information on the master carton and the identification information on one or more of the point-of-sale packages contained by the master carton can cause problems for either the retail store or the business that receives the master carton, which may create a negative impression. As another example, a mobile phone that is delivered with the wrong preferred roaming list (PRL) installed in a memory of the mobile phone may provide sub-standard communication service.

The first auditing station 102a may suitably be used to perform automated audits of electronic devices 114, point-of-sale packages, and master cartons. When a problem is discovered by the first auditing system 102a, a notification of the problem may be presented, for example by the display 116 presenting a message to an operator of the first auditing station 102a, by the speaker 119 emitting an audible alert tone to call the operator to the first auditing station 102a, and/or by sending an email message to a responsible auditor and/or manager.

Figure 2:
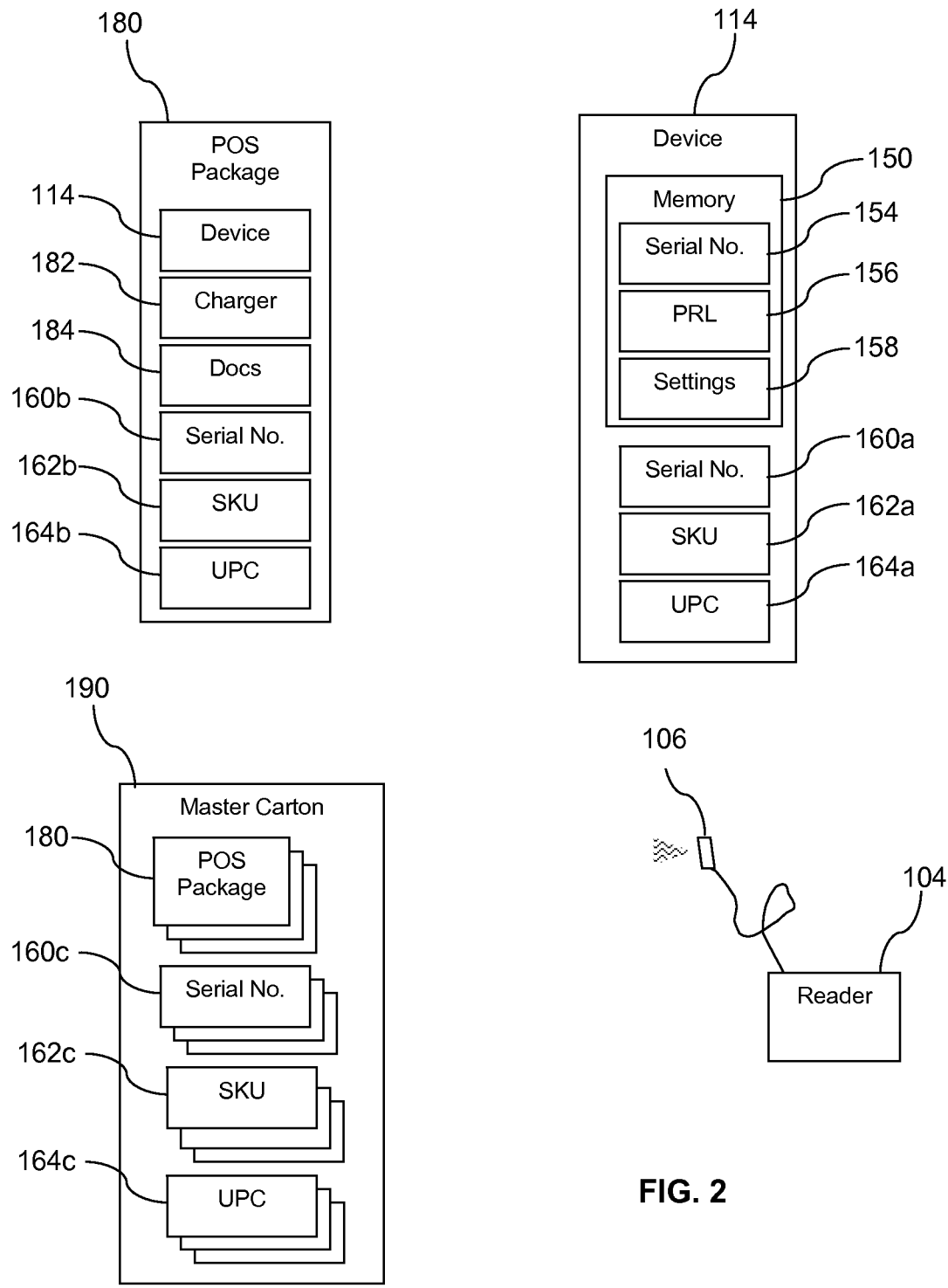
FIG. 2 is a block diagram of exemplary audited items according to an embodiment of the disclosure.

Turning now to FIG. 2, use of the electronic sensor 106 and the electronic reader 104 is described. The electronic sensor 106 and electronic reader 104 may be employed to electronically read identification information and other information on one or more of the electronic devices 114, a point-of-sale package 180, and/or a master carton 190. In an embodiment, the electronic sensor 106 and the electronic reader 104 may be integrated in a single device, for example as a scanner gun. The electronic device 114 may comprise a plurality of labels or tags graphically representing identification information, for example bar codes, two-dimensional bar codes such as ShotCodes or Semacodes, or other visible identification codes. The point-of-sale package 180 may contain a charger 182, one or more documents 184, and other accessories.

Alternatively, the electronic device 114 may comprise one or more radio frequency identification (RFID) tags that contain identification information. In an embodiment, the electronic device 114 may comprise a serial number 160a, a stock keeping unit (SKU) number 162a, a universal product code (UPC) 164a, and/or other identification information. The identification information may be adhered to the body of the electronic device 114, for example inside a battery compartment of the electronic device 114. The electronic sensor 106 may read and send the identification information to the electronic reader 104 for interpretation or decoding.

In an embodiment, the electronic device 114 comprises a memory 150 that stores a serial number 154, a preferred roaming list 156, and one or more settings 158. An operator may pass the electronic sensor 106 over the identification information 160a, 162a, 164a to cause the electronic reader 104 to read this identification information. The docking station 112 may electronically access the memory 150 and read the serial number 154. In an embodiment, the serial number 154 may be an electronic serial number (ESN). Both the identification information 160a, 162a, 164a and the serial number 154 may be transmitted by the processor 117 to the auditing computer 120 for storage in the data store 124. The identification information read by the electronic reader 104 and the identification information accessed by the docking station 112 may be sent to the processor 117, and the processor 117 compares the identification information to determine if the serial number 154 stored in the memory 150 of the electronic device 114 agrees with the serial number 160a. If a miscompare is determined, the processor 117 may cause a notification of the error to be presented, for example one or more of causing an audio alert to be emitted by the speaker 119, causing a textual message to be presented on the display 116, and/or to send an email to a responsible auditer and/or manager.

The operator may pass the electronic sensor 106 over the identification information 160b, 162b, 164b on the point-of-sale package 180 as well as over the identification information 160c, 162c, 164c on the master carton. In an embodiment, the master carton may have identification information 160c, 162c, 164c associated with each of the electronic devices 114 contained within the master carton 190 located on the outside of the master carton. This identification information may be sent by the electronic reader 104 to the processor 117, and the processor 117 may transmit the identification information to the auditing computer 120 for storage in the data store 124. The processor 117 compares the serial numbers 160a, 160b, 160c to determine if the serial numbers are in agreement. When the serial numbers 160a, 160b, 160c are not in agreement, that is when a miscompare occurs, the processor 117 causes a notification of the error to be presented as described above.

Likewise, the processor 117 may compare the stock keeping unit numbers 162a, 162b, 162c to determine if the stock keeping unit numbers are in agreement. When the stock keeping unit numbers 162a, 162b, 162c are not in agreement, when a miscompare occurs, the processor 117 causes a notification of the error to be presented as described above. Likewise, the processor 117 may compare the universal product codes 164a, 164b, 164c to determine if the universal product codes 164a, 164b, 164c are in agreement. When the universal product codes 164a, 164b, 164c are not in agreement, when a miscompare occurs, the processor 117 causes a notification of the error to be presented as described above.

It is understood that in some embodiments one or more of the serial numbers 160, stock keeping unit numbers 162, and universal product codes 164 may be omitted from one or more of the electronic devices 114, the point-of-sale package 180, and the master carton 190, and the comparison operations of the processor 117 would be adapted accordingly. In response to the notification of the error, a responsible auditor may take action to remedy the error. This action may include correcting the error by replacing one or more of the identification information, for example removing an erroneous stock keeping unit number 162b from the point-of-sale package 180 and replacing with a correct stock keeping unit number 162b. The action may further include performing a root cause analysis to discover how the erroneous stock keeping unit number 162b happened to be applied to the point-of-sale package 180, whereby to correct a possible error in the process so that the error does not recur.

Turning again to FIG. 1, in an embodiment the point-of-sale package 180—either with the electronic device 114 contained or not contained by the package—may be weighed by the scale 108. The scale 108 may transmit an indication of the measured weight of the point-of-sale package 180 to the processor 117. Based on a comparison of the measured weight of the point-of-sale package 180 and an expected weight, the processor 117 may determine whether the intended accessories and documentation are contained in the point-of-sale package 180. Such accessories may comprise one or more of a battery charger, a carrying case, an earpiece, and other accessories. The documentation may include a user's manual, safety warning information, promotional sales literature, and other documentation.

In an embodiment, a digital photograph of the contents of the point-of-sale package 180 may be created—either by the digital camera 118 or by the camera of the electronic device 114—and the image may be analyzed by the processor 117 to determine whether the accessories and documentation are contained in the point-of-sale package 180. The image may also be analyzed to determine if the camera of the electronic device 114 meets design and/or quality standards, for example by comparing to a stored image file. In an embodiment, the determination of whether the point-of-sale package 180 contains the intended accessories and documentation may be based both on weighing the point-of-sale package 180 and on the analysis of an image of the point-of-sale package 180—whether the image is produced by the digital camera 118 or by the camera of the electronic device 114.

A tester may press the keys of the electronic device 114, and the processor 117 and/or the auditing application 122 may determine if each of the keys of the electronic device 114 has been pressed and/or how many times each of the keys of the electronic device 114 has been pressed. In an embodiment, a test may entail pressing each of the keys of the electronic device 114 two times. As the keys are pressed, the processor 117 and/or the auditing application 122 may provide feedback to the tester via the display 116 about which keys have been pressed once and which keys have been pressed twice. Alternatively, or in combination, the processor 117 and/or the auditing application 122 may provide feedback to the tester via the display 116 about which keys have not yet been pressed once and which keys have not yet been pressed twice. Alternatively, the processor 117 may indicate a different number of times the keys of the electronic device 114 have been pressed and/or a different number of times remain for the keys of the electronic device 114 to be pressed. In response to the pressing of the keys, a presentation—for example, a textual presentation on the display 116—providing key press event feedback may be adapted for, by example, removing keys from a presented list of expected key press events or adding keys to a presented list of detected key press events.

Formerly, testers may have entered a specific key sequence that used all of the keys and read back a textual message from a screen of the electronic device 114, for example typing "the quick brown fox jumped over the lazy dog." This may have been a tedious and time consuming activity. This functionality of the processor 117 and/or the auditing application 122 may reduce the time that a tester may need to spend to test the keys. Based on the processor 117 and/or the auditing application 122 prompting the tester to enter those keys not yet pressed, the system 100 can promote the pressing of each button without the tester needing to press the keys in the customary order.

In an embodiment, the optional keypad actuation robot 110 may actuate each of the keys of the electronic device 114. The optional keypad actuation robot 110 may send these inputs to the processor 117, and the processor 117 may determine whether the keys are providing the expected inputs. This test may involve the optional keypad actuation robot 110 pressing each key at least two times, and the processor 117 verifying that two distinct inputs for each key are received. This test may involve verifying that pressing a 'c' key results in receiving a 'c' input and discriminating this from the case where pressing the 'c' key results in receiving a 'k' input or other unrelated input. While the actuation component shown in FIG. 1 and described above is referred to as the optional keypad actuation robot 110, it is understood that other actuation devices may be employed to stimulate the keypad of the electronic device 114. For example, an electro-mechanical actuator may be commanded by the processor 117 to sequence through key presses of each key two or more times, and the processor 117 may read the inputs received via the application programming interface of the electronic device 114, for example using a cable, using the docking station 112, or using another communication link.

The electronic device 114 may be plugged into the docking station 112 to promote the processor 117 reading information from the electronic device 114 via the docking station 112, for example the serial number 154, the preferred roaming list 156, the settings 158, and other information. The processor 117 may execute test routines that activate a variety of functions of the electronic device 114. The processor 117 may command the electronic device 114 to playback an audio via a speaker of the electronic device 114, the microphone 115 may pick-up the acoustic signal emitted by the speaker, and the processor 117 may compare the signal received by the microphone 115 to an expected amplitude and/or template audio. The processor 117 may make an adjustment of a speaker volume of the electronic device 114 based on the comparison of the signal received by the microphone 115 to the expected amplitude.

The processor 117 may command the electronic device 114 to receive an acoustic signal via a microphone of the electronic device 114, for example an acoustic signal emitted by a speaker portion of the docking station 112 or by the speaker 119. The processor 117 may compare the signal received by the microphone of the electronic device 114 to an expected amplitude and/or template audio and may adjust a sensitivity or other parameter of the microphone of the electronic device 114. Alternatively, if the electronic device 114 does not perform within specifications, the processor 117 may provide a notification via an aural alert and/or an email message to prompt a responsible auditor and/or manager to address the subject problem. In an embodiment, the docking station 112 may be a mechanical structure for holding the electronic device 114, and electronic communication with the electronic device may be provided by one or more cables between the processor 117 and the electronic device 114. In an embodiment, the docking station 112 may comprise a connector into which a mechanical structure of the docking station 112 guides one or more contactors of the electronic device 114, whereby electronic communications between the electronic device 114 and the docking station 112 and/or the processor 117 may be provided.

The processor 117 may command a camera of the electronic device 114 to take a photograph. The processor 117 may then read an image file created by the camera from the memory 150 of the electronic device 114 and analyze this image file for quality. If the image file does not provide the specified quality, the processor 117 may provide a notification via an aural alert and/or an email message to prompt a responsible auditor and/or manager to address the problem. The processor 117 may command the digital camera 118 to take a digital photograph of the electronic device 114 and/or of the point-of-sale package 180. The processor 117 may analyze the image file created by the digital camera 118 for compliance with cosmetic standards. If the electronic device 114, the point-of-sale package 180, and/or the master carton 190 do not comply with cosmetic standards, the processor 117 may provide a notification via an aural alert and/or an email message to prompt a responsible auditor and/or manager to address the problem. In an embodiment, the processor 117 may command the camera of the electronic device 114 to take a digital picture of the point-of-sale package 180. The processor 117 may analyze the image file created by the camera of the electronic device 114 to determine both that the camera functions and that the point-of-sale package 180 complies with cosmetic standards.

In an embodiment, the processor 117 may command a vibrator of the electronic device 114 to activate. An optional vibration sensor (not shown) may detect the vibration of the electronic device 114 and provide feedback about this vibration to the processor 117 for use in validating the functionality of the vibrator. Alternatively, in an embodiment, the microphone 115 may detect an audible sound of the vibration of the vibrator and provide feedback about this audible sound to the processor 117 for use in validating the functionality of the vibrator.

The auditing of the electronic device 114, the point-of-sale package 180, and/or the master carton 190 may be automatically carried out by the processor 117 by executing one or more auditing programs and/or scripts. The results of auditing one or more electronic devices 114 may be transmitted by the processor 117 to the auditing computer 120. The display 116 and/or the speaker 119 may be employed to alert a responsible auditor of a problem discovered while auditing the electronic device 114, the point-of-sale package 180, and/or the master carton 190. The responsible auditor may enter information at a terminal coupled to the processor 117, for example to write up a report of the identified problem, to take corrective action, and/or to perform root cause analysis.

The auditing computer 120 may store audit results and audit data in the first data store 124 and/or in a second data store 128. The auditing computer may be coupled to the second data store 128 via a network 126. The network 126 may be a public network, a private network, or a combination thereof. The auditing computer 120 may execute an auditing application 122 that processes the audit results and/or audit data before it is stored in the data store 124, 128. The auditing application 122 may support a variety of search and/or analysis functions that may be invoked remotely and that promote analyzing the audit results and/or audit data to assist troubleshooting any future problems that may be experienced with the electronic device 114 after it has been deployed to the end user, for example a customer.

Figure 3:
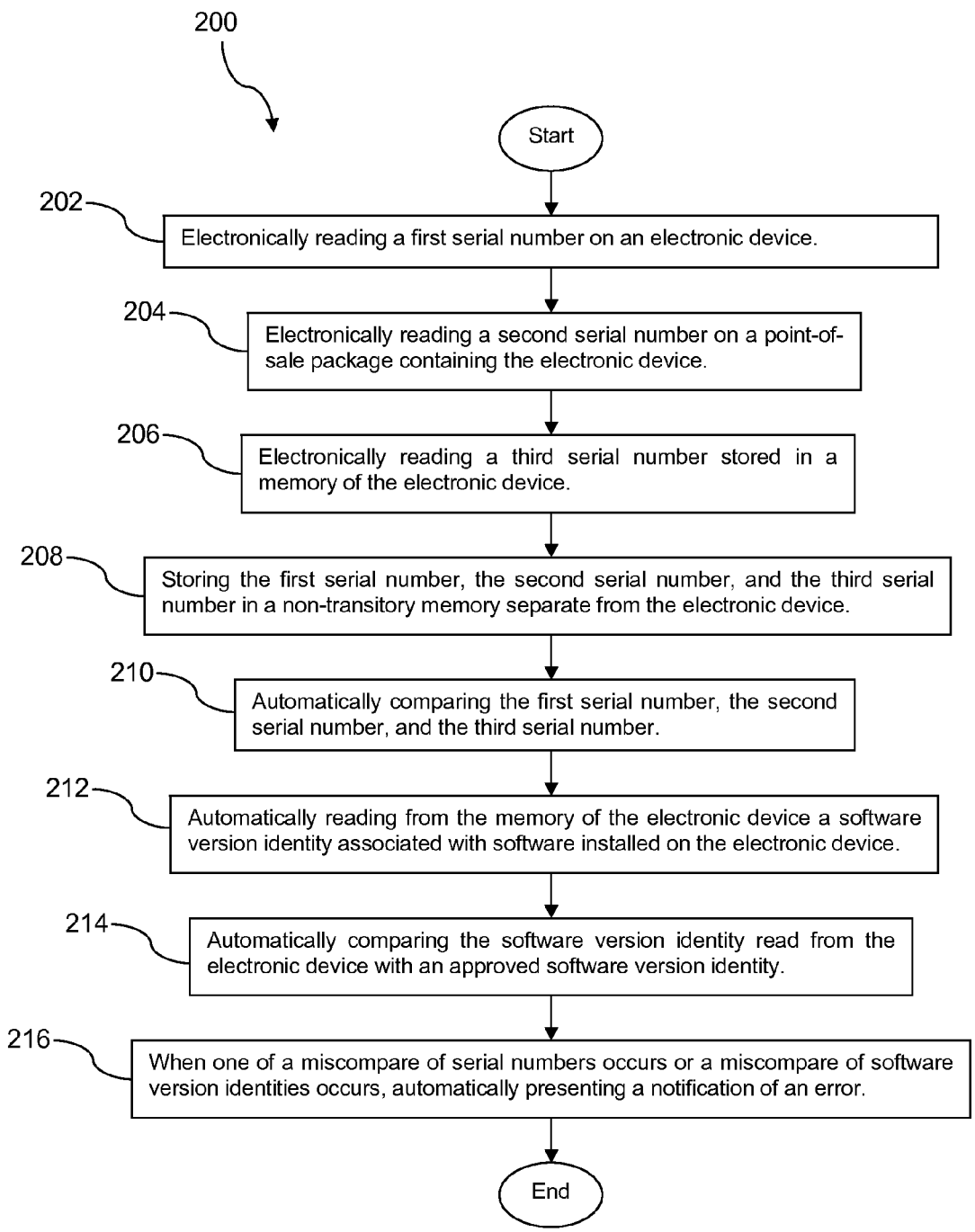
FIG. 3 is a flow chart of a method according to an embodiment of the disclosure.

Turning now to FIG. 3, a method 200 is described. At block 202, a first serial number on the electronic device 114 is read electronically. For example, a bar code or two-dimensional bar code placed on the inside battery cover is read by the electronic sensor 106 and the electronic reader 104. At block 204, a second serial number located on a point-of-sale package associated with the electronic device 114 is read electronically in a like manner. At block 206, a third serial number stored in a memory of the electronic device 114 is electronically read by the docking station 112 and/or via a cable attached between the processor 117 and the electronic device 114. In an embodiment, a fourth serial number located on a master carton associated with the electronic device 114 is read electronically in a like manner. A plurality of serial numbers and other identification information may be located on the outside of the master carton, for example serial numbers and/or identifications of each of the electronic devices 114 contained by the master carton. At block 208, the first serial number, the second serial number, the third serial number, and optionally the fourth serial number are stored in a non-volatile memory separate from the electronic device 114. The serial numbers may be stored in a memory forming part of the processor 117, stored in the first data store 124, and/or stored in the second data store 128.

At block 210, the first serial number, the second serial number, the third serial number, and optionally the fourth serial number are automatically compared. For example, the processor 117 compares the serial numbers to determine that the serial numbers are all identical. If the serial numbers are not identical, the processor 117 determines that a miscompare has occurred.

At block 212, a software version identity is automatically read from the memory 150 of the electronic device 114, for example a firmware identity. The software version identity may be read by the docking station 112 or by the processor 117 coupled to the electronic device 114 by an electrical cord or cable. At block 214, the software version identity is automatically compared to an approved software version identity. For example, the processor 117 compares the software version identity read from the memory 150 to an approved software version identity stored in the processor 117. If the software version identity and the approved software version identity are not identical, the processor 117 determines that a miscompare has occurred. At block 216, if a miscompare of either serial numbers or software version identities occurs, a notification of an error is automatically presented, for example presenting a message on the display 116, sounding an alert tone on the speaker 119, and/or sending an email to an auditor and/or a manager.

Figure 4:
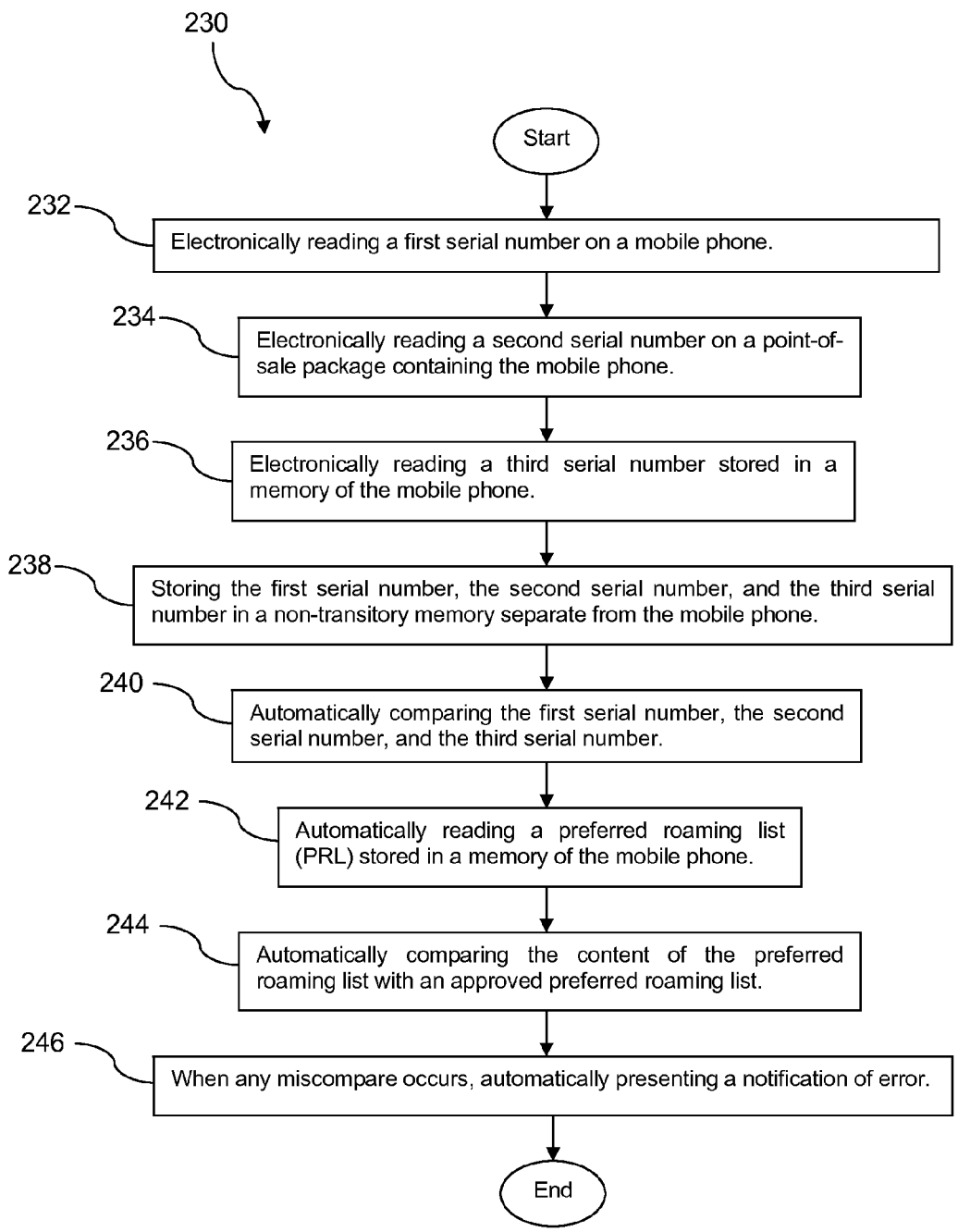
FIG. 4 is a flow chart of a method according to an embodiment of the disclosure.

Turning now to FIG. 4, a method 230 is described. At block 232, a first serial number on a mobile phone is read electronically. For example, a bar code or two-dimensional bar code placed on the inside battery cover is read by the electronic sensor 106 and the electronic reader 104. At block 234, a second serial number located on a point-of-sale package associated with the mobile phone is read electronically in a like manner. At block 236, a third serial number stored in a memory of the mobile phone is electronically read by the docking station 112 and/or via a cable attached between the processor 117 and the electronic device 114. In an embodiment, a fourth serial number located on a master carton associated with the mobile phone is read electronically in a like manner. At block 238, the first serial number, the second serial number, the third serial number, and optionally the fourth serial number are stored in a non-volatile memory separate from the electronic device 114. The serial numbers may be stored in a memory forming part of the processor 117, stored in the data store 124, and/or stored in the data store 128.

At block 240, the first serial number, the second serial number, the third serial number, and optionally the fourth serial number are automatically compared. For example, the processor 117 compares the serial numbers to determine that the serial numbers are all identical. If the serial numbers are not identical, the processor 117 determines that a miscompare has occurred.

At block 242, a preferred roaming list is automatically read from a memory of the mobile phone. At block 244, the content of the preferred roaming list is compared to an approved roaming list, for example the processor 117 compares the preferred roaming list read from the mobile phone to an approved preferred roaming list stored in a memory coupled to the processor 117. At block 246, when a miscompare occurs, for example a miscompare among the serial numbers at block 240 or a miscompare between the read preferred roaming list and the approved preferred roaming list at block 244, a notification is automatically presented.

Figure 5:
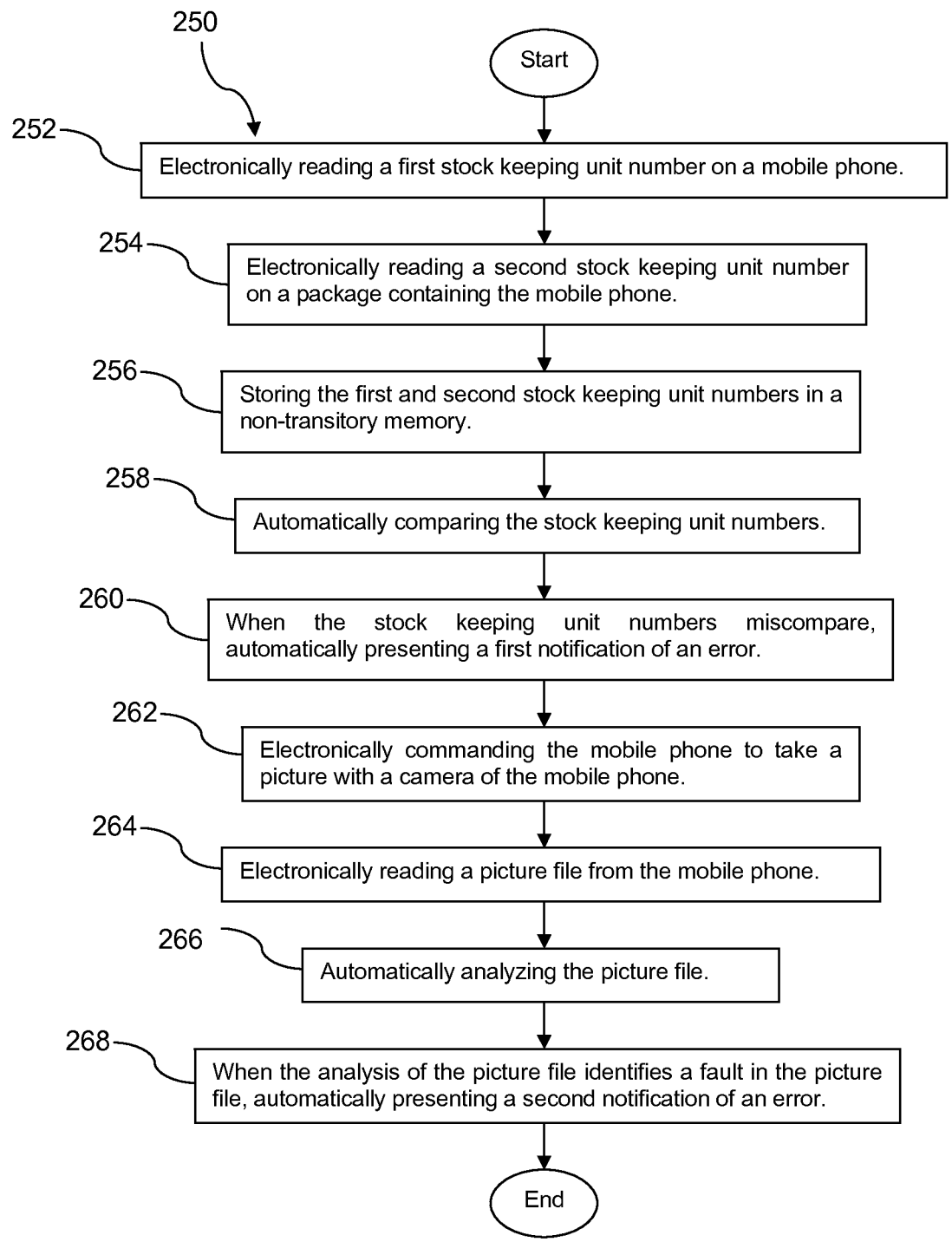
FIG. 5 is a flow chart of a method according to an embodiment of the disclosure.

Turning now to FIG. 5, a method 250 is described. At block 252, a first stock keeping unit number located on a mobile phone is read electronically. For example, a bar code or two-dimensional bar code placed on the inside battery cover is read by the electronic sensor 106 and the electronic reader 104. At block 254, a second stock keeping unit number located on a package containing the mobile phone is read electronically in a like manner. In an embodiment, a third stock keeping unit number located on a master carton containing a plurality of packages is read electronically in a like manner. At block 256, the first stock keeping unit number, the second stock keeping unit number, and optionally the third stock keeping unit number are stored in a non-transitory memory, for example stored in a non-volatile memory coupled to the processor 117, stored in the data store 124, and/or stored in the data store 128. At block 258, the stock keeping unit numbers are automatically compared. For example, the processor 117 compares the stock keeping unit numbers. At block 260, when the stock keeping unit numbers miscompare, a first notification of an error is automatically presented.

At block 262, the mobile phone is automatically commanded to take a picture with a camera of the mobile phone. At block 264, a picture file created on the mobile phone during the course of taking the picture is electronically read from the mobile phone, for example by the docking station 112 and/or by the processor 117. At block 266, the picture file is automatically analyzed. For example, the processor 117 analyzes the picture file. The processor 117 may compare the picture file to a stored authoritative picture file and determine if the read picture file is sufficiently similar to the authoritative picture file. The processor 117 may analyze the picture file using a digital image processing algorithm to determine if the stored digital image is in focus. At block 268, when the analysis of the picture file identifies a fault in the picture file, a second notification of an error is automatically presented.

Figure 6A:
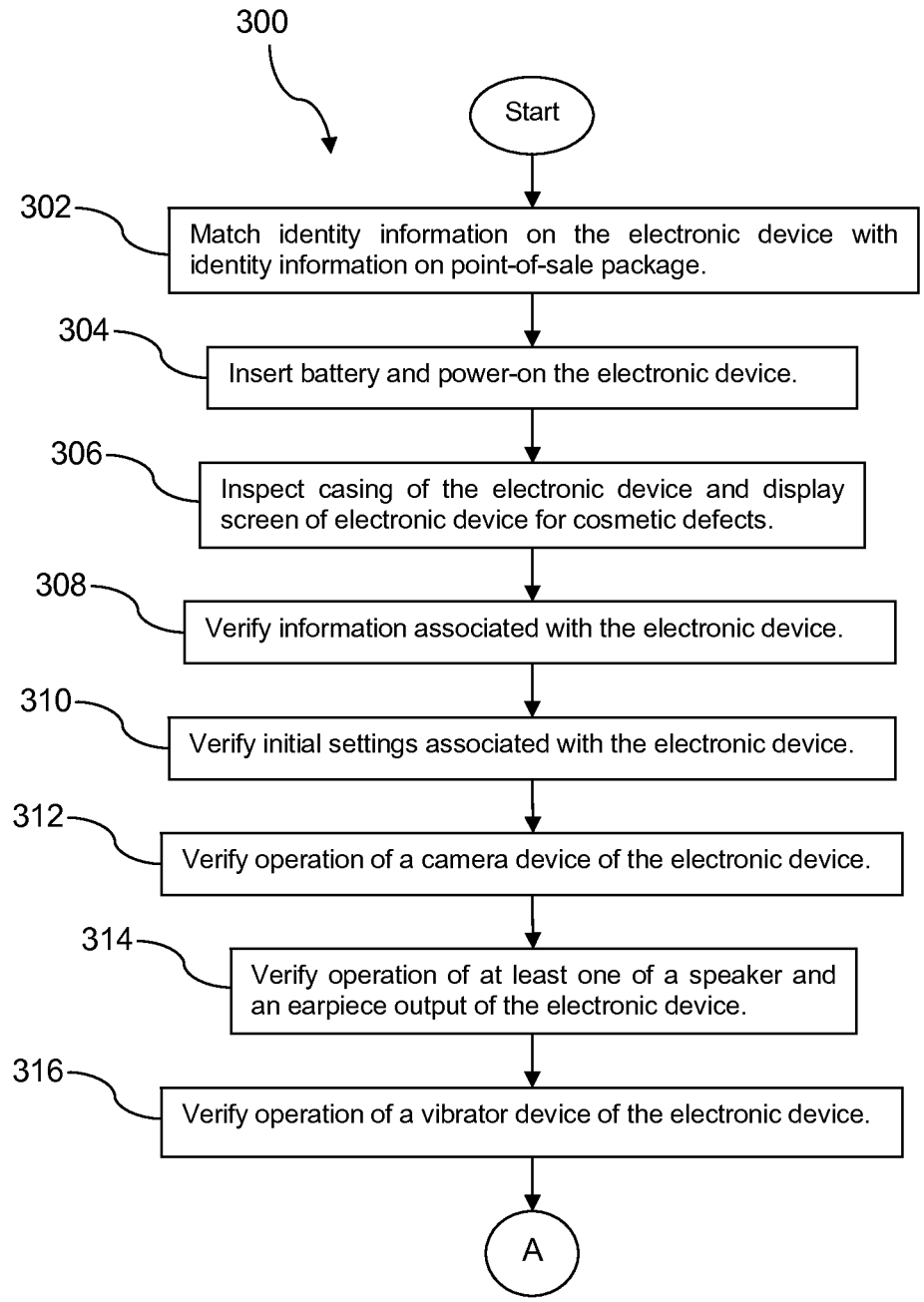
FIG. 6A is a flow chart of a method according to an embodiment of the disclosure.
Figure 6B:
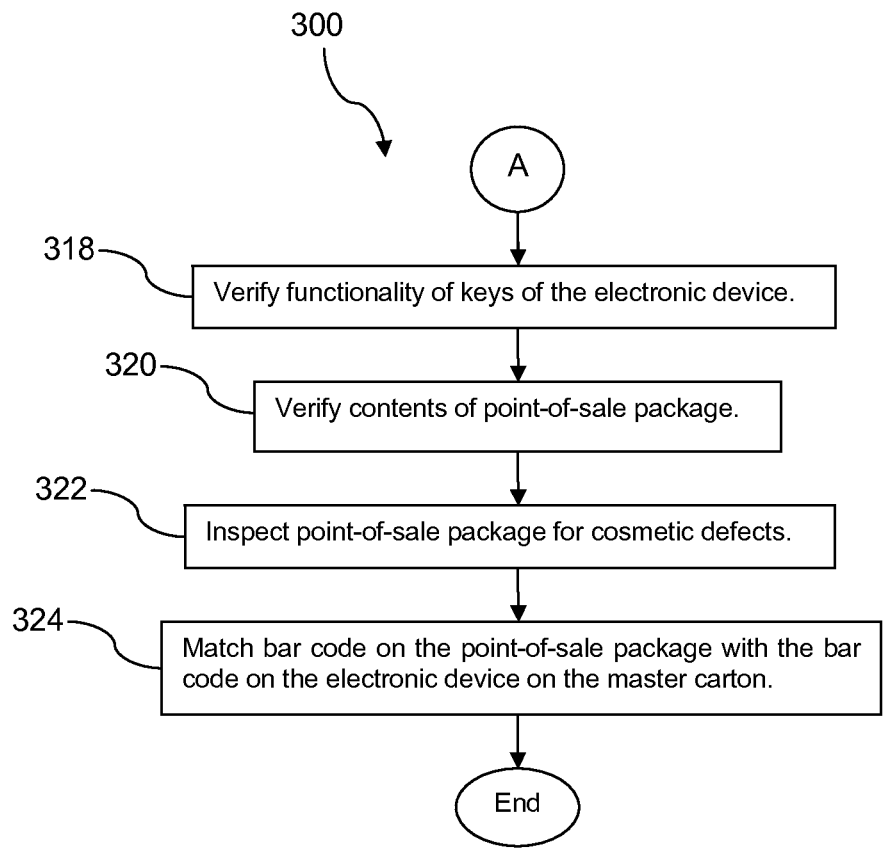
FIG. 6B is a flow chart of a method according to an embodiment of the disclosure.

Turning now to FIG. 6A and FIG. 6B, a method 300 is described. At block 302, one or more information on labels affixed to the electronic device 114, for example identification information, are automatically read, corresponding identification information on labels affixed to the point-of-sale package 180 associated with the electronic device 114 are automatically read, and these identification information items are compared to determine if the associated identification information items match. The identification information may be provided as bar codes, two-dimensional codes, or other representation, and the identification information may be read by using a hand-held scanning device, such as the electronic reader 104. For example, an electronic serial number label affixed to the interior or exterior of the electronic device 114 is read, an electronic serial number label affixed to the point-of-sale package 180 is read, and the two values of the electronic serial number are compared by the system 100 and/or the auditing station 102a, for example by the processor 117. If the two values are not substantially identical, an error may be reported by the automated auditing system 100, for example, a miscompare message may be presented on the display 116 and/or an aural alert may be sounded by the speaker 119. Likewise, other identification information may be compared, for example, stock keeping unit (SKU) numbers, mobile subscriber identity (MSID) numbers, and other codes may be compared in block 302. If any miscompares occur, the system 100 may record and store the miscompare event for analysis and/or historical purposes.

At block 304, a battery is installed into the electronic device 114 and the electronic device 114 is powered on, for example by activating a switch on the electronic device 114. At block 306, a casing and display of the electronic device 114 are inspected for cosmetic defects such as scratches, gouges, chips, breakage, and other. If the electronic device 114 exhibits unacceptable cosmetic defects, the electronic device 114 may be sent back to a supplier. Additionally, a record of the rejection of the electronic device 114 for cosmetic defect may be recorded and stored using the automated auditing system 100, for example, by a tester using a keyboard (not shown) of the auditing station 102a. In an embodiment, the casing and display of the electronic device 114 may be inspected by taking a digital picture of the electronic device 114 and analyzing the resultant digital image to identify cosmetic defects.

At block 308, information associated with the electronic device 114 is verified. The system 100 may automatically navigate user interface menus of the electronic device 114, for example by using an application programming interface (API) provided by the user interface, to read information associated with the electronic device 114, for example, an electronic serial number (ESN), a mobile subscriber identity (MSID), and/or other electronically stored information. The system 100 may read information stored on the electronic device 114 such as a pre-defined address book associated with the electronic device 114 that may have been purchased by an enterprise for use by its employees. The pre-defined address book may include contact information for key managers and/or colleagues. The pre-defined address book may include contact information for customers, for example customers along a delivery route. After reading the information from the electronic device, the system 100 may validate this information by comparing it to a table of design and/or manufacturing specifications. If the information miscompares with the design and/or manufacturing specifications, an alert may be activated to cue a tester to the error. Additionally, if the information miscompares to the design and/or manufacturing specifications, the miscompare event and the information read from the electronic device 114 may be stored, for example in the data store 124.

At block 310, initial settings of the electronic device 114 are verified. The system 100 may automatically navigate user interface menus of the electronic device 114, for example by using an application programming interface provided by the user interface, to read initial settings of the electronic device 114. For example, system 100 may read initial settings of a volume of a speaker device of the electronic device 114. The system 100 may read initial settings of a language preference. The system 100 may read initial settings of a display text size. The system 100 may read other initial settings from the electronic device 114. After reading the initial settings from the electronic device 114, the system 100 may validate the initial settings by comparing them to a table of design and/or manufacturing specifications. If the initial settings miscompare with the design and/or manufacturing specifications, an alert may be activated to cue a tester to the error. Additionally, if the initial settings miscompare to the design and/or manufacturing specifications, the miscompare event and the initial settings read from the electronic device 114 may be stored, for example in the data store 124.

At block 312, operation of a camera device of the electronic device 114 is verified. The system 100 may automatically cause the camera device to take a picture, automatically read an image file created by the electronic device 114 based on the picture taken by the camera device, and compare the image file to a design and/or manufacturing specification for the image file. If the image file miscompares to the design and/or manufacturing specification for the image file, an alert may be activated to cue the tester to the error and the image file created by the electronic device 114 may be stored, for example in the data store 124.

At block 314, operation of at least one of a speaker device and an earpiece output of the electronic device 114 is verified. The system 100 may automatically play back an audio signal via the speaker device of the electronic device and/or an earpiece output of the electronic device 114. The system 100 may listen for the audio output of the speaker device using the microphone 115. The system 100 may sense the output of the earpiece output of the electronic device 114, for example via a contact of the docking station 112. The system 100 may compare the received audio output of the speaker device and/or the earpiece output to a design and/or manufacturing specification for the audio output. If the received audio output miscompares to the design and/or manufacturing specification for the audio output, an alert may be activated to cue the tester to the error and the audio output may be stored, for example in the data store 124.

At block 316, operation of a vibrator device of the electronic device 114 is verified. The system 100 may actuate the vibrator device, for example using an application programming interface of the electronic device 114. The system 100 may sense the mechanical vibration of the vibrator device using a mechanical sensor, for example an accelerometer coupled to the docking station 112, or by sensing with the microphone 115 the acoustic energy emitted by the vibration of the vibrator device. If the system 100 does not sense any mechanical vibration of the vibrator device, an alert may be activated to cue the tester to the error and the error may be stored, for example in the data store 124.

At block 318, functionality of keys of the electronic device 114 are verified. In an embodiment, the keys of the electronic device 114 may be electro-mechanical buttons. Alternatively, in an embodiment, the keys of the electronic device 114 may be provided as touch-sensitive areas on a display of the electronic device 114. In an embodiment, the electronic device may provide a combination of electro-mechanical keys and touch-sensitive areas. The system 100 may actuate functionality of the keys using an application programming interface of the electronic device 114. Alternatively, the tester may physically press the keys. Alternatively, the system 100 may comprise the optional keypad actuation robot 110, and the optional keypad actuation robot 110, under automatic control of the system 100 and/or of the auditing station 102a, may actuate the functionality of the keys.

The system 100 receives feedback about the key actuations, for example, electrical signals and optional tones generated by the key actuations. The system 100 determines if the functionality of the keys is satisfactory. If the key functionality is unsatisfactory, an alert may be activated to cue the tester to the error and an error event identifying the faulty key and/or keys may be stored in the data store 124. In an embodiment, the system 100 and/or the auditing station 102a may present an indication of progress of the key press test on the display 116. For example, the display 116 may indicate every key that has completed testing. The display 116 may indicate every key that has been pressed once and every key that has been pressed twice. The display 116 may provide a list of keys which have not yet been pressed twice.

At block 320, the contents of the point-of-sale package 180 is verified. The point-of-sale package 180 may be expected to contain the electronic device 114, the charger 182, one or more documents 184, and possibly additional items and/or accessories. In an embodiment, the contents of the point-of-sale package 180 may be verified by weighing the point-of-sale package 180 and comparing to an expected weight of a correctly stocked point-of-sale package 180. If the sensed weight of the point-of-sale package 180 miscompares to the expected weight, an alert may be activated to cue the tester to the error and the sensed weight may be stored in the data store 124.

At block 322, the point-of-sale package 180 is inspected for cosmetic defects. If the point-of-sale package 180 exhibits unacceptable cosmetic defects, a record of the defect may be stored in the data store 124. In an embodiment, the point-of-sale package 180 may be inspected by taking a digital picture of the point-of-sale package 180 and analyzing the resultant digital image to identify cosmetic defects. At block 324, an identification information item on the master carton 190 is read, for example using the electronic reader 104, and the identification information item on the master carton 180 is compared with an associated code on the point-of-sale package 180. For example, the serial number 160c on the master carton 190 is compared with the serial number 160b on the point-of-sale package 180; the stock keeping unit number 162c on the master carton 190 is compared with the stock keeping unit number 162b on the point-of-sale package 180; and/or the universal product code 164c on the master carton 190 is compared with the universal product code 164b on the point-of-sale package 180. When any identification information on the master carton 190 miscompares with the corresponding identification information on the point-of-sale package 180, an alert may be presented to the tester and a record of the miscompare may be stored in the data store 124.

It is understood that the steps of method 300 need not follow the order in which they are depicted in FIG. 6A and FIG. 6B, and in an embodiment, the order of some steps may be shifted. Additionally, in an embodiment, some of the steps of method 300 may be combined. The method 300 may be repeated for a plurality of electronic devices 114 and a plurality of master cartons 190. The electronic devices 114 may be a selected sample, for example, the first 100 units of a new mobile phone device being shipped to retail stores or from an original equipment manufacturer to a communication service provider. After completion of the method 300 for a single instance of the electronic device 114, a summary result record may be stored in the data store 124.

The data store 124, after completion of testing of all of the electronic devices 114 during a testing session, may comprise a set of test result data—data that includes the results of each test of each electronic device 114 as well as more specific details about individual test step failures. This test result data may be analyzed to determine an overall pass/fail ratio for a subject group of electronic devices 114. This test result data may further be analyzed to perform more specific statistical analysis to determine, for example, that the keypads of electronic devices 114 shipped by a specific original equipment manufacturer are exhibiting a higher failure rate than corresponding keypads of electronic devices 114 shipped by a different original equipment manufacturer. The results of the more specific analysis may be used to open a dialogue with the original equipment manufacturer producing electronic devices 114 exhibiting a higher keyboard failure rate, for example to persuade the subject original equipment manufacturer to implement more aggressive process controls or to more directly supervise a vendor of component parts.

Other examples of error trend analysis may include a variety of circumstances and/or failures. For example, an increased incidence of erroneous preferred roaming list (PRL) configurations in the electronic device 114 may be identified and corrected. An increased incidence of speaker and/or microphone failures of the electronic device 114 may be identified and corrected. An increased incidence of miscompare between identification information on labels affixed to the electronic device 114, identification information on the point-of-sale package 180, and identification information on the master carton 190 may be identified and corrected. It is contemplated that the results of the testing following method 300 may be analyzed to identify other issues with the electronic devices 114, the point-of-sale packages 180, and/or the master cartons 190. The automated automation system 100 may promote avoidance of shipping electronic devices 114 that may create a negative impression on customers. Additionally, the automated system 100 may promote rapid understanding and correction of process problems.

Figure 7:
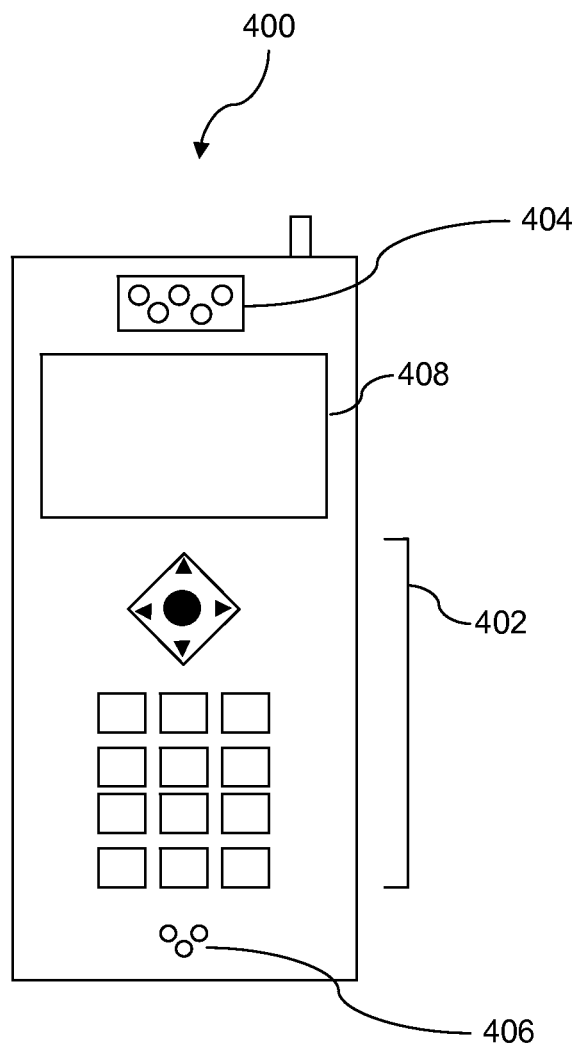
FIG. 7 is an illustration of an electronic device according to an embodiment of the disclosure.

Turning now to FIG. 7, a mobile device 400 is described. While the mobile device 400 is illustrated in FIG. 7 as a mobile phone, it is understood that the mobile device 400 may take other forms such as personal digital assistant, media player, and other forms. In an embodiment, the electronic device 114 described above may correspond substantially to the mobile device 400.

The mobile device 400 comprises a display 408 and a touch-sensitive surface and/or keys 402 for input by a user. The mobile device 400 may comprise a speaker 404 and a microphone 406. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400.

Figure 8:
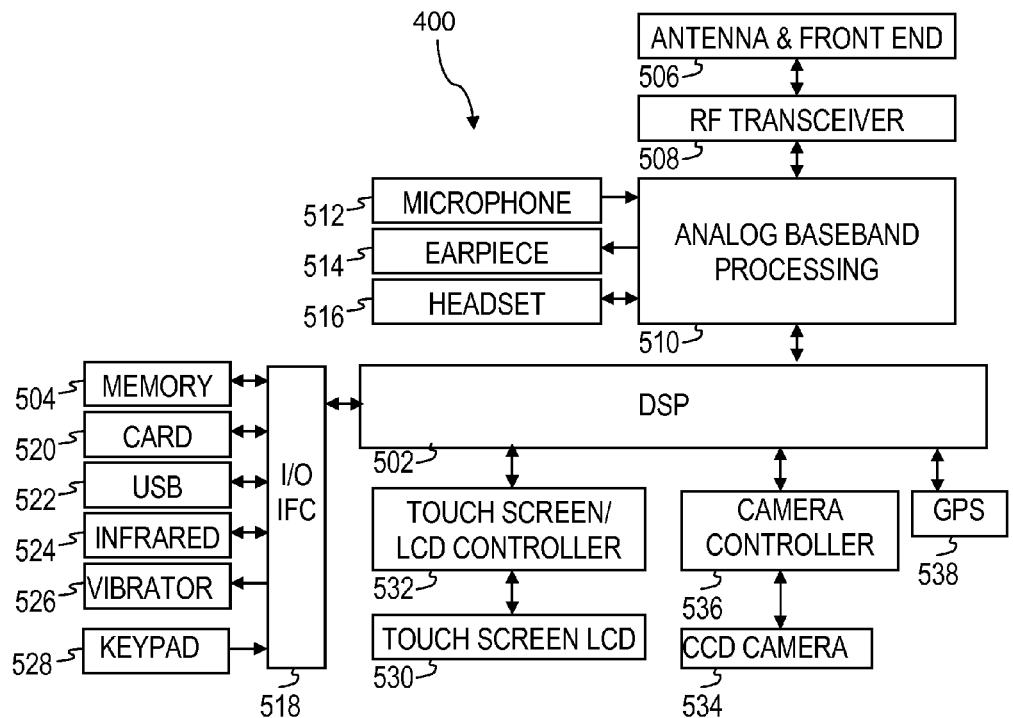
FIG. 8 is a block diagram of an electronic device according to an embodiment of the disclosure.

FIG. 8 shows a block diagram of the mobile device 400. While a variety of known components of handsets 400 are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions, e.g., radio and television reception.

Figure 9:
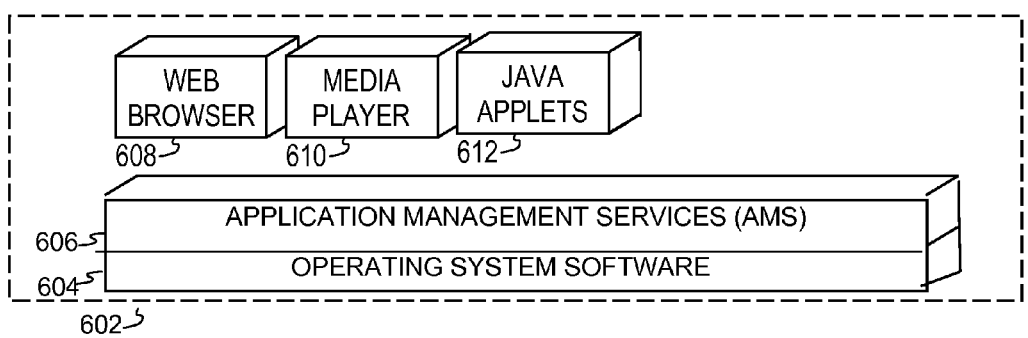
FIG. 9 is a block diagram of a software architecture of an electronic device according to an embodiment of the disclosure.

FIG. 9 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 9 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 10:
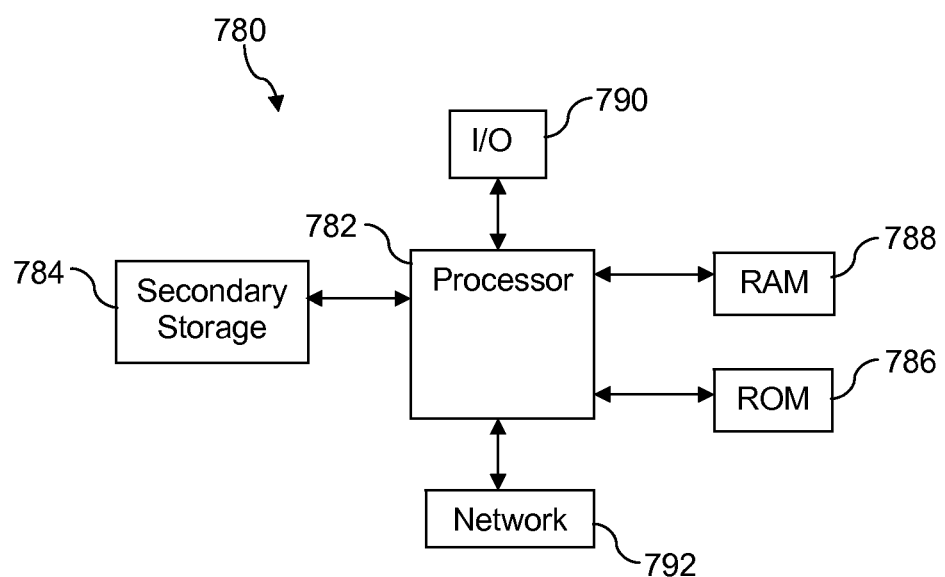
FIG. 10 illustrates an exemplary computer system suitable for implementing the several embodiments of the disclosure.

FIG. 10 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of auditing electronic device shipments, comprising:
   electronically reading a first serial number on an electronic device;
   electronically reading a second serial number on a point-of-sale package containing the electronic device;
   electronically reading a third serial number stored in a memory of the electronic device;
   storing the first serial number, the second serial number, and a third serial number in a non-transitory memory separate from the electronic device;
   automatically comparing, by a processor, the first serial number, the second serial number, and the third serial number;
   automatically reading from the memory of the electronic device a software version identity associated with software installed on the electronic device;
   automatically comparing, by the processor, the software version identity read from the electronic device with an approved software version identity;
   when one of a miscompare of serial numbers occurs or a miscompare of software version identities occurs, automatically presenting a notification of an error;
   pressing a plurality of keys of a keypad of the electronic device; and
   in response to the pressing of the keys, adapting, by the processor, a presentation providing key press event feedback, wherein the key press event feedback comprises one of removing keys from a presented list of expected key press events or adding keys to a presented list of detected key press events.

2. The method of claim 1, wherein the electronic device is one of a mobile phone, a personal digital assistant (PDA), and a media player.

3. The method of claim 1, further comprising:
   when a customer service call associated with the electronic device is received, automatically accessing the stored first, second, and third serial numbers;
   automatically comparing the stored first, second, and third serial numbers with a plurality of serial numbers provided by the customer service call; and
   providing customer service when the stored first, second, and third serial numbers compare with the plurality of serial numbers provided by the customer service call.

4. The method of claim 1, further comprising:
   automatically reading a plurality of initial settings from the electronic device;
   automatically determining that the initial settings satisfy an approved initial settings specification; and
   when the initial settings do not satisfy the approved initial settings specification, automatically presenting a notification of an error.

5. The method of claim 4, wherein automatically reading a plurality of initial settings comprises triggering a ringer of the electronic device to activate, receiving an audible ring emitted by the ringer with a microphone, and determining a ringer volume level initial setting based on analyzing the audible ring received by the microphone.

6. The method of claim 1, further comprising:
   automatically activating a vibrator of the electronic device;
   automatically detecting a vibration of the electronic device; and
   when the detected vibration of electronic device is less than a specified vibration level, automatically presenting a notification of an error.

7. The method of claim 1, further comprising:
   automatically reading a preferred roaming list (PRL) from the memory of the electronic device;
   automatically comparing the preferred roaming list read from the memory of the electronic device to an approved preferred roaming list; and
   when the preferred roaming list read from the memory of the electronic device miscompares with the approved preferred roaming list, automatically presenting a notification of an error.

8. The method of claim 1, wherein the first serial number, the second serial number, and the third serial number are associated with an electronic serial number (ESN) of the electronic device.

9. The method of claim 1, further comprising:
   inserting a battery into the electronic device;
   actuating a power-on button of the electronic device;
   inspecting at least one of a phone casing or a phone display screen for cosmetic condition;
   inspecting the point-of-sale package for cosmetic condition;
   automatically verifying information stored in the phone, the stored information comprising at least a preferred roaming list;
   automatically taking a picture using a camera device of the electronic device;
   automatically validating the picture;
   automatically verifying at least one of a speaker device of the electronic device and a phone earpiece output of the electronic device;
   testing a vibrator device of the electronic device;
   automatically reading a preferred roaming list (PRL) from the memory of the electronic device;
   automatically comparing the preferred roaming list read from the memory of the electronic device to an approved preferred roaming list; and
   when the preferred roaming list read from the memory of the electronic device miscompares with the approved preferred roaming list, automatically presenting a notification of an error;
   automatically weighing the electronic device, the point-of-sale package containing the electronic device, and at least one of accessories or printed material; and
   automatically validating the weight determined by weighing.

10. A method of auditing mobile phone shipments, comprising:
    electronically reading a first serial number on a mobile phone;
    electronically reading a second serial number on a point-of-sale package containing the mobile phone;
    electronically reading a third serial number stored in a memory of the mobile phone;
    storing the first serial number, the second serial number, and the third serial number in a non-transitory memory separate from the mobile phone;
    automatically comparing, by a processor, the first serial number, the second serial number, and the third serial number;
    automatically sensing a weight of the point-of-sale package and contents;
    automatically comparing, by the processor, the weight to a predefined weight range;
    automatically taking a picture of the point-of-sale package contents with a digital camera;
    automatically comparing, by the processor, an image of the point-of-sale package contents to a predefined image;

when one of the weight is outside of the predefined weight range or the image of the point-of-sale contents does not compare to the predefined image, automatically sending a notification of an error;

electronically playing a message through a speaker of the mobile phone and a headset jack of the mobile phone;

receiving an audible signal emitted by the speaker with a microphone;

determining, by the processor, a sound amplitude level based on analyzing the audible signal received by the microphone;

receiving an electrical signal output by the headset jack;

automatically determining, by the processor, an amplitude of the electrical output by the headset jack;

when the sound amplitude level is less than an approved volume setting, automatically presenting a notification of an error; and when the amplitude of the electrical output of the headset lack is less than an approved headset lack amplitude, automatically presenting a notification of an error.

11. The method of claim 10, further comprising:

electronically commanding the mobile phone to take a picture with a camera of the mobile phone;

electronically reading the picture file from the mobile phone;

automatically analyzing the picture file;

storing at least one of the picture file or the results of the analysis of the picture file in a memory that is separate from the mobile phone; and when the analysis of the picture file identifies a fault in the picture file, automatically presenting a notification of error.

12. The method of claim 10, further comprising:

determining a sound fidelity of the speaker based on comparing the received audible signal with the message; and when the sound fidelity is less than a predetermined level of fidelity, presenting a notification of an error.

13. The method of claim 10, further including assigning an employee to remedy the cause of the miscompare.

14. The method of claim 10, wherein electronically reading the first, second, and third serial numbers comprises capturing a photograph of the serial numbers using a digital camera and analyzing a digital image file produced by the digital camera to read the serial numbers.

15. The method of claim 10, further comprising:

automatically reading a preferred roaming list stored in the memory of the mobile phone;

automatically comparing the content of the preferred roaming list with an approved preferred roaming list; and when the preferred roaming list does not match the approved preferred roaming list, automatically presenting a notification of an error.

16. A method of auditing mobile phone shipments, comprising:

electronically reading a first stock keeping unit (SKU) number on a mobile phone;

electronically reading a second stock keeping unit number on a package containing the mobile phone;

storing the first and second stock keeping unit numbers in a non-transitory memory;

automatically comparing, by a processor, the stock keeping unit numbers;

when the stock keeping unit numbers miscompare, automatically presenting a first notification of an error;

electronically commanding the mobile phone to take a picture with a camera of the mobile phone;

electronically reading a picture file from the mobile phone;

automatically analyzing, by the processor, the picture file;

when the analysis of the picture file identifies a fault in the picture file, automatically presenting a second notification of an error;

automatically reading a preferred roaming list (PRL) from the memory of the mobile phone;

automatically comparing, by the processor, the preferred roaming list read from the memory of the mobile phone to an approved preferred roaming list;

when the preferred roaming list read from the memory of the mobile phone miscompares with the approved preferred roaming list, automatically presenting a notification of an error;

electronically playing a message through a speaker of the mobile phone and a headset lack of the mobile phone;

receiving an audible signal emitted by the speaker with a microphone;

determining, by the processor, a sound amplitude level based on analyzing the audible signal received by the microphone;

receiving an electrical signal output by the headset lack;

automatically determining, by the processor, an amplitude of the electrical output by the headset lack;

when the sound amplitude level is less than an approved volume setting, automatically presenting a notification of an error; and when the amplitude of the electrical output of the headset lack is less than an approved headset lack amplitude, automatically presenting a notification of an error.

17. The method of claim 16, further comprising:

automatically capturing a picture of the package with a digital camera;

automatically analyzing a digital image file produced by the digital camera to determine if the package has any cosmetic defects; and when the analysis of the digital image file identifies a cosmetic defect of the package, automatically presenting a notification of an error.

18. The method of claim 16, further comprising:

scanning a serial number on the package;

scanning a serial number on a master carton containing a plurality of packages each containing a mobile phone;

automatically comparing the serial number on the package with the serial number on the master carton; and when a miscompare between the serial number on the package and the serial number on the master carton occurs, automatically presenting a notification of an error.

19. The method of claim 18, further comprising:

storing the serial number on the package and the serial number on the master carton in the non-transitory memory; and building a final inspection list based on the stock keeping unit numbers and the serial numbers stored in the non-transitory memory.

* * * * *